(12) United States Patent
Kosaki et al.

(10) Patent No.: US 8,072,725 B2
(45) Date of Patent: Dec. 6, 2011

(54) CONNECTION UNIT AND VEHICLE INCORPORATING THE SAME

(75) Inventors: Akihiro Kosaki, Aichi-ken (JP); Masaaki Iwabe, Makinohara (JP); Kenji Iida, Kariya (JP); Yoshinobu Furuya, Makinohara (JP); Yoshiaki Ichikawa, Makinohara (JP)

(73) Assignees: Toyota Jidosha Kabushiki Kaisha, Toyota-Shi (JP); Yazaki Corporation, Minato-Ku, Tokyo (JP); Toyota Boshoku Kabushiki Kaisha, Kariya-Shi (JP)

( * ) Notice: Subject to any disclaimer, the term of this patent is extended or adjusted under 35 U.S.C. 154(b) by 206 days.

(21) Appl. No.: 12/618,855

(22) Filed: Nov. 16, 2009

(65) Prior Publication Data

US 2010/0123989 A1    May 20, 2010

(30) Foreign Application Priority Data

Nov. 14, 2008    (JP) .................................. 2008-292030

(51) Int. Cl.
   *H02H 5/04*    (2006.01)

(52) U.S. Cl. ........................................ 361/93.1; 361/23

(58) Field of Classification Search .................... 361/23, 361/93.1; 307/9.1, 10.1
   See application file for complete search history.

(56) References Cited

U.S. PATENT DOCUMENTS

| 6,747,457 B2 * | 6/2004 | Suzuki ........................... 324/433 |
| 7,759,817 B2 * | 7/2010 | Soma et al. .................... 307/9.1 |

FOREIGN PATENT DOCUMENTS

| JP | 2004120866 A | 4/2004 |
| JP | 2004166376 A | 6/2004 |
| JP | 2004282822 A | 10/2004 |
| JP | 2007060820 A | 3/2007 |
| JP | 2008005658 A | 1/2008 |
| JP | 2008149897 A | 7/2008 |
| JP | 2008167620 A | 7/2008 |
| JP | 2008220057 A | 9/2008 |

* cited by examiner

*Primary Examiner* — Danny Nguyen
(74) *Attorney, Agent, or Firm* — Gifford, Krass, Sprinkle, Anderson & Citkowski, P.C.

(57) ABSTRACT

A connection unit includes a first relay connected between a first electrode of a first battery and a first power feed line towards a vehicle load, a second relay connected between a second electrode of the first battery and a second power feed line towards the vehicle load, a third relay and a current limiting resistor connected in series between the second electrode of the first battery and the second power feed line, a fourth relay connected between an electrode of a second battery having a polarity identical to the polarity of the first electrode and the first power feed line towards the vehicle load, and a conductor line connecting an electrode of the second battery having a polarity identical to the polarity of the second electrode with the second electrode of the first battery. There can be provided a connection unit suppressed in the number of components, suitable for usage in a vehicle incorporating a plurality of power storage devices, and a vehicle incorporating the connection unit.

8 Claims, 7 Drawing Sheets

CONNECTION UNIT AND VEHICLE INCORPORATING THE SAME

This nonprovisional application is based on Japanese Patent Application No. 2008-292030 filed on Nov. 14, 2008 with the Japan Patent Office, the entire contents of which are hereby incorporated by reference.

BACKGROUND OF THE INVENTION

1. Field of the Invention

The present invention relates to a connection unit and a vehicle incorporating the connection unit. More particularly, the present invention relates to a connection unit employed in a vehicle having a plurality of power storage devices switched for usage.

2. Description of the Background Art

In recent years, electric cars, hybrid vehicles, fuel-cell vehicles and the like have been developed and adapted to practical use as environment-friendly vehicles. These vehicles are incorporated with a motor and a power storage device for driving the motor.

Japanese Patent Laying-Open No. 2008-167620 discloses a power supply device for a vehicle having a plurality of externally chargeable batteries switched for usage.

It is desirable that the distance an electric vehicle can run by one charging operation is as long as possible. Likewise with a hybrid vehicle that incorporates an internal combustion engine, a storage battery, and a motor, it is desirable that the running distance allowed per one charge without using the internal combustion engine is as long as possible in the case of employing a configuration in which the storage battery can be charged from an external source.

In order to increase the running distance allowed by one charge, the amount of energy of the battery incorporated in a vehicle must be increased. One approach is to incorporate a plurality of power storage devices into the vehicle. Although the required capacitance can be ensured by connecting battery cells in parallel, there may be the case where the capability of all the batteries incorporated will not be thoroughly depleted due to only some of the batteries first becoming degraded. In this context, another approach is to provide a plurality of batteries in a switchable manner, allowing the batteries to be depleted equally by switching to another battery when one is depleted.

However, if a connection unit similar to that of a conventional case (a junction box) is provided per one battery in vehicles operating with switching power supplies, more relays will be required, leading to the problem of increase in weight and cost.

SUMMARY OF THE INVENTION

In view of the foregoing, an object of the present invention is to provide a connection unit suitable for use in a vehicle incorporating a plurality of power storage devices, suppressed in the number of components for the devices, and a vehicle incorporating the connection unit.

According to an aspect of the present invention, a connection unit connecting first and second power storage devices to a vehicle load includes a first relay connected between a first electrode of the first power storage device and a first power feed line towards the vehicle load, a second relay connected between a second electrode of the first power storage device having a polarity differing from the polarity of the first electrode and a second power feed line towards the vehicle load, a third relay and a current limiting resistor connected in series between the second electrode of the first power storage device and the second power feed line, a fourth relay connected between an electrode of the second power storage device having a polarity identical to the polarity of the first electrode and the first power feed line towards the vehicle load, and a conductor line connecting an electrode of the second power storage device having a polarity identical to the polarity of the second electrode to the second electrode.

Preferably, the first relay has a vehicle load side connected to the vehicle load side of the fourth relay at a first internal node. The connection unit further includes a current sensor or fuse arranged between the first internal node and the vehicle load.

Preferably, the third relay and current limiting resistor are connected in series between a second internal node and a third internal node. The second relay is connected between the second internal node and the third internal node. The connection unit further includes a current sensor or fuse arranged between the vehicle load and one of the second and third internal nodes located at the vehicle load side.

According to another aspect of the present invention, a vehicle incorporates a connection unit set forth above.

According to the present invention, the number of components, the weight and cost, as well as the installation space of the connection unit are reduced, advantageous in the production of vehicles.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
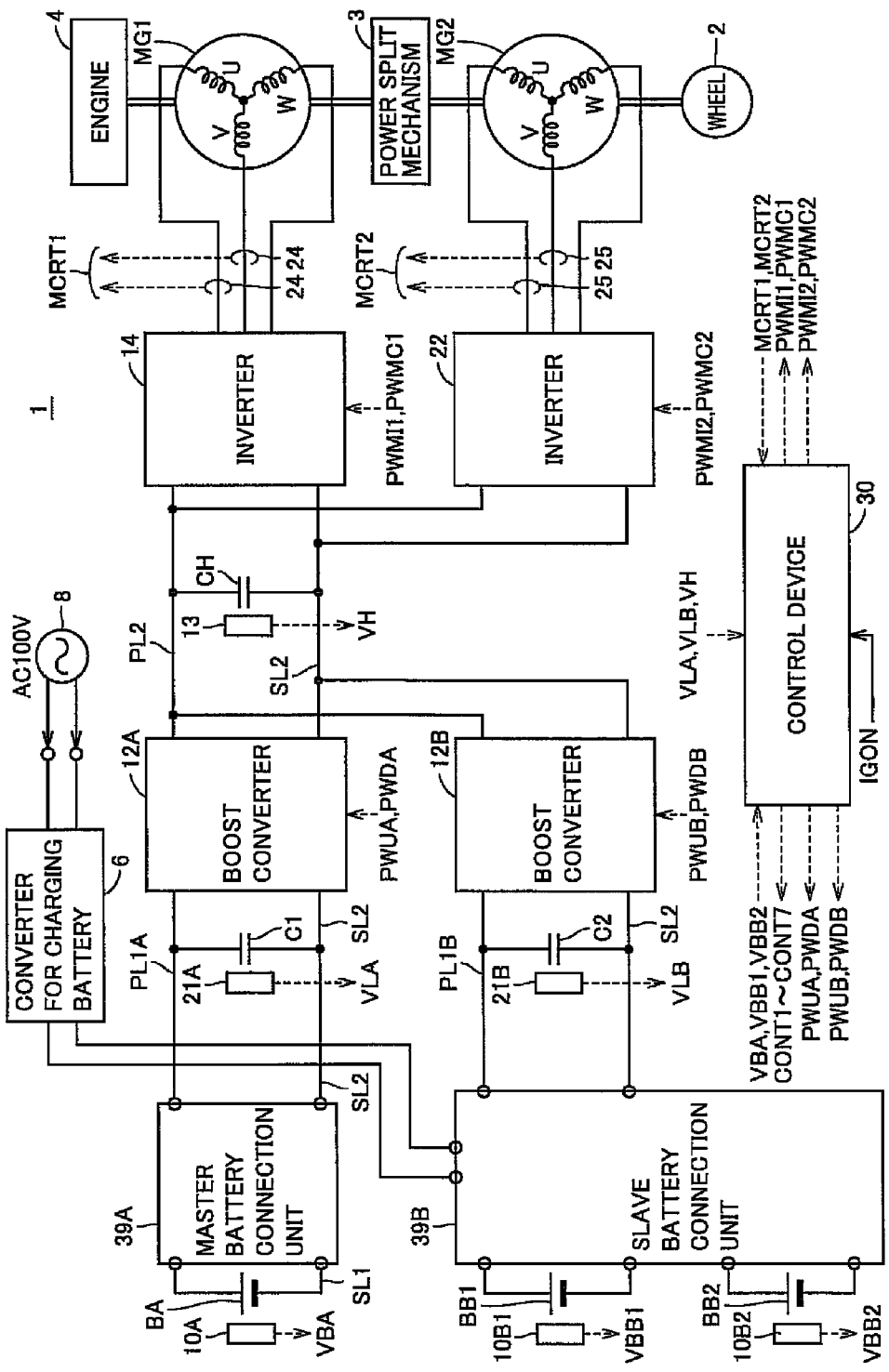
FIG. 1 represents a main configuration of a vehicle 1 according to an embodiment of the present invention.

Embodiments of the present invention will be described hereinafter with reference to the drawings. In the drawings, the same or corresponding elements have the same reference characters allotted, and description thereof will not be repeated.

FIG. 1 represents a main configuration of a vehicle 1 according to an embodiment of the present invention.

Referring to FIG. 1, vehicle 1 includes batteries BA, BB1 and BB2 as the power storage devices, a master battery connection unit 39A, a slave battery connection unit 39B, boost converters 12A and 12B, smoothing capacitors C1, C2 and CH, voltage sensors 10A, 10B1, 10B2, 13, 21A and 21B, inverters 14 and 22, an engine 4, motor generators MG1 and MG2, a power split mechanism 3, a wheel 2, and a control device 30.

The vehicle power supply apparatus of the present embodiment includes battery BA that is the main power storage device, a power feed line PL2 through which power is supplied to inverter 22 that drives motor generator MG2, boost converter 12A for voltage conversion provided between battery BA and power feed line PL2, batteries BB1 and BB2 provided parallel to each other, qualified as a plurality of subpower storage devices, and boost converter 12B for voltage conversion, provided between subpower storage devices BB1, BB2 and power feed line PL2.

Boost converter 12B is selectively connected to any one of batteries BB1 and BB2 to carry out voltage conversion.

The subpower storage device (either BB1 or BB2) and the main power storage device (BA) have the chargeable capacitance set such that the tolerable maximum power of the electrical load (inverter 22 and motor generator MG2) connected to the power feed line can be output by simultaneous usage, for example. Accordingly, running at the maximum power is allowed in an EV (Electric Vehicle) run that does not use the engine. If the storage state of the subpower storage device is degraded, the subpower storage device can be exchanged to conduct further running. When the power of the subpower storage device is consumed, running at the maximum power is allowed by using the engine in addition to the main power storage device without the subpower storage device being used.

According to the configuration set forth above, the number of boost converters does not have to be increased as much as the number of power storage devices since boost converter 12B is shared among a plurality of subpower storage devices. Although FIG. 1 corresponds to the case where two subpower storage devices are provided, a battery may be added, parallel to batteries BB1 and BB2, in order to further increase the EV running distance.

The power storage device incorporated in the vehicle can be charged from an external source. For this purpose, vehicle 1 further includes a battery charge converter 6 to connect with a commercial power supply 8 of AC100V, for example. Battery charge converter 6 converts an alternating current into direct current and also adjusts the voltage to be supplied to the battery. For the purpose of allowing external charging, the scheme of connecting the neutral points of the stator coils of motor generators MG1 and MG2 with an AC power supply, or the scheme of combining boost converters 12A and 12B to function as an AC/DC converter may be employed.

Smoothing capacitor C1 is connected between a power supply line PL1A and a ground line SL2. Voltage sensor 21A detects and provides to control device 30 a voltage VLA across smoothing capacitor C1. Boost converter 12A boosts the voltage across smoothing capacitor C1.

Smoothing capacitor C2 is connected between a power supply line PL1B and ground line SL2. Voltage sensor 21B detects and provides to control device 30 a voltage VLB across smoothing capacitor C2. Boost converter 12B boosts the voltage across smoothing capacitor C2.

Smoothing capacitor CH smoothes the voltage VH boosted by boost converters 12A and 12B. Voltage sensor 13 senses and provides to control device 30 a voltage VH across smoothing capacitor CH.

Inverter 14 converts the DC voltage applied from boost converter 12B or 12A into a 3-phase AC voltage, which is provided to motor generator MG1. Inverter 22 converts the DC voltage applied from boost converter 12B or 12A into a 3-phase AC voltage, which is provided to motor generator MG2.

Power split mechanism 3 is coupled to engine 4 and motor generators MG1 and MG2 to split the power therebetween. For example, a planetary gear mechanism including three rotational shafts of a sun gear, a planetary carrier, and a ring gear may be employed as the power split mechanism. In the planetary gear mechanism, when the rotation of two of the three rotational shafts is determined, the rotation of the remaining one rotational shaft is inherently determined. These three rotational shafts are connected to each rotational shaft of engine 4, motor generator MG1, and motor generator MG2, respectively. The rotational shaft of motor generator MG2 is coupled to wheel 2 by means of a reduction gear and/or differential gear not shown. Further, a reduction gear for the rotational shaft of motor generator MG2 may be additionally incorporated in power split mechanism 3.

Voltage sensor 10A measures voltage VA across battery BA. Although not shown, a current sensor sensing the current flowing to battery BA is provided to monitor the state of charge of battery BA, together with voltage sensor 10A. For battery BA, a secondary battery such as a lead battery, nickel-hydride battery, and lithium ion battery, or a capacitor of large capacitance such as an electrical double layer capacitor may be employed.

Ground line SL2 runs through boost converters 12A and 12B towards inverters 14 and 22, as will be described afterwards.

Voltage sensor 10B1 measures a voltage VBB1 across battery BB1. Voltage sensor 10B2 measures a voltage VBB2 across battery BB2. Although not shown, a current sensor to sense the current flowing to each battery is provided to monitor the state of charge of batteries BB1 and BB2, together with voltage sensors 10B1 and 10B2. For batteries BB1 and BB2, a secondary battery such as a lead battery, nickel-hydride battery, and lithium ion battery, or a capacitor of large capacitance such as an electrical double layer capacitor may be employed.

Inverter 14 is connected to power feed line PL2 and ground line SL2. Inverter 14 receives the boosted voltage from boost converters 12A and 12B to drive motor generator MG1 for the purpose of, for example, starting engine 4. Further, inverter 14 returns to boost converters 12A and 12B the electric power generated at motor generator MG1 by the power transmitted from engine 4. At this stage, boost converters 12A and 12B are controlled by control device 30 to function as down-conversion circuits.

Current sensor 24 detects the current flowing to motor generator MG1 as a motor current value MCRT1, which is provided to control device 30.

Inverter 22 is connected to power feed line PL2 and ground line SL2, parallel with inverter 14. Inverter 22 converts DC voltage output from boost converters 12A and 12B into a 3-phase AC voltage, which is provided to motor generator MG2 that drives wheel 2. Inverter 22 also returns the power generated at motor generator MG2 to boost converters 12A and 12B in accordance with regenerative braking. At this stage, boost converters 12A and 12B are controlled by control device 30 to function as down-conversion circuits.

Current sensor 25 detects the current flowing to motor generator MG2 as a motor current value MCRT2. Motor current value MCRT2 is output to control device 30.

Control device 30 receives each torque command value and rotation speed of motor generators MG1 and MG2, each value of voltages VBA, VBB1, VBB2, VLA, VLB, and VH, motor current values MCRT1, MCRT2, and an activation signal IGON. Control device 30 outputs to boost converter 12B a control signal PWUB to effect a voltage boosting instruction, a control signal PWDB to effect a voltage down-conversion instruction, and a shut down signal to effect an operation prohibition instruction.

Further, control device 30 outputs to inverter 14 a control signal PWMI1 to effect a drive instruction for converting DC voltage that is the output from boost converters 12A and 12B into AC voltage directed to driving motor generator MG1, and a control signal PWMC1 to effect a regenerative instruction for converting the AC voltage generated at motor generator MG1 into a DC voltage to be returned towards boost converters 12A and 12B.

Similarly, control device 30 outputs to inverter 22 a control signal PWMI2 to effect a drive instruction for converting the AC voltage directed to driving motor generator MG2 into a DC voltage, and a control signal PWMC2 to effect a regenerative instruction for converting the AC voltage generated at motor generator MG2 into a DC voltage to be returned towards boost converters 12A and 12B.

Figure 2:
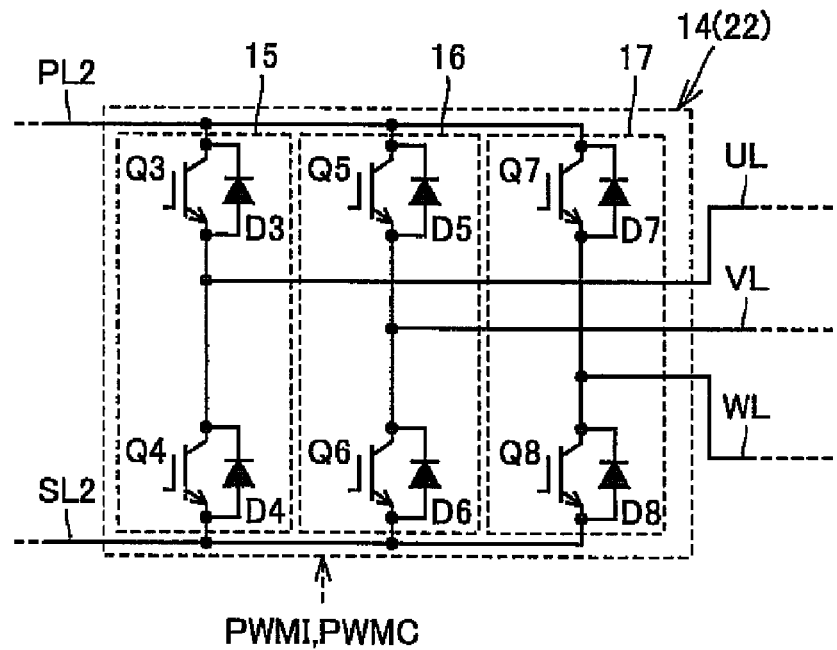
FIG. 2 is a circuit diagram representing a detailed configuration of inverters 14 and 22 of FIG. 1.

FIG. 2 is a circuit diagram representing a detailed configuration of inverters 14 and 22 of FIG. 1.

Referring to FIGS. 1 and 2, inverter 14 includes a U-phase arm 15, a V-phase arm 16, and a W-phase arm 17. U-phase arm 15, V-phase arm 16, and W-phase arm 17 are connected in parallel between power feed line PL2 and ground line SL2.

U-phase arm 15 includes IGBT elements Q3 and Q4 connected in series between power feed line PL2 and ground line SL2, and diodes D3 and D4 connected in parallel with IGBT elements Q3 and Q4, respectively. Diode D3 has its cathode connected to the collector of IGBT element Q3, and its anode connected to the emitter of IGBT element Q3. Diode D4 has its cathode connected to the collector of IGBT element Q4, and its anode connected to the emitter of IGBT element Q4.

V-phase arm 16 includes IGBT elements Q5 and Q6 connected in series between power feed line PL2 and ground line SL2, and diodes D5 and D6 connected in parallel with IGBT elements Q5 and Q6, respectively. Diode D5 has its cathode connected to the collector of IGBT element Q5, and its anode connected to the emitter of IGBT element Q5. Diode D6 has its cathode connected to the collector of IGBT element Q6, and its anode connected to the emitter of IGBT element Q6.

W-phase arm 17 includes IGBT elements Q7 and Q8 connected in series between power feed line PL2 and ground line SL2, and diodes D7 and D8 connected in parallel with IGBT elements Q7 and Q8, respectively. Diode D7 has its cathode connected to the collector of IGBT element Q7, and its anode connected to the emitter of IGBT element Q7. Diode D8 has its cathode connected to the collector of IGBT element Q8, and its anode connected to the emitter of IGBT element Q8.

The intermediate point of each phase arm is connected to each phase end of each phase coil of motor generator MG1. Specifically, motor generator MG1 is a 3-phase permanent magnet synchronous motor. The three coils of the U, V and W-phase have each one end connected together to the neutral point. The other end of the U-phase coil is connected to a line UL drawn out from the connection node of IGBT elements Q3 and Q4. The other end of the V-phase coil is connected to a line VL drawn out from the connection node of IGBT elements Q5 and Q6. The other end of the W-phase coil is connected to a line WL drawn out from the connection node of IGBT elements Q7 and Q8.

Inverter 22 of FIG. 1 is similar to inverter 14 as to the internal circuit configuration, provided that it is connected to motor generator MG2. Therefore, detailed description thereof will not be repeated. For the sake of simplification, FIG. 2 is depicted with control signals PWMI and PWMC applied to the inverter. Different control signals PWMI1 and PWMC1, and control signals PWMI2 and PWMC2 are applied to inverters 14 and 22, respectively, as shown in FIG. 1.

Figure 3:
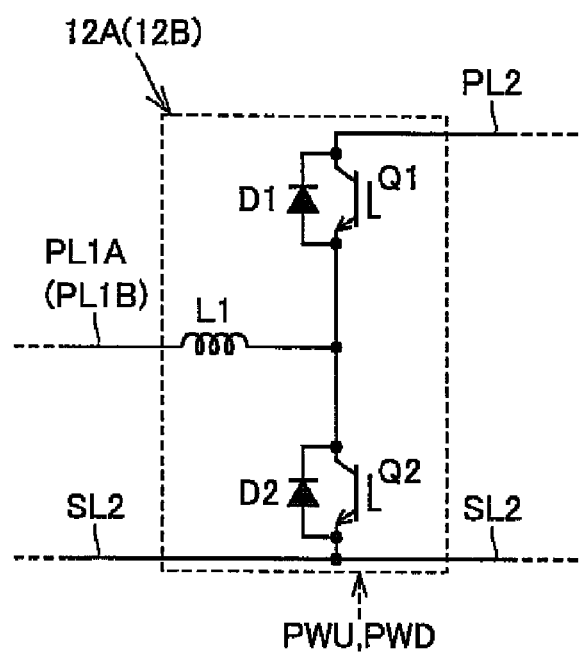
FIG. 3 is a circuit diagram representing a detailed configuration of boost converters 12A and 12B of FIG. 1.

FIG. 3 is a circuit diagram representing a detailed configuration of boost converters 12A and 12B of FIG. 1.

Referring to FIGS. 1 and 3, boost converter 12A includes a reactor L1 having one end connected to power supply line PL1A, IGBT elements Q1 and Q2 connected in series between power feed line PL2 and ground line SL2, and diodes D1 and D2 connected in parallel with IGBT elements Q1 and Q2, respectively.

Reactor L1 has the other end connected to the emitter of IGBT element Q1 and the collector of IGBT element Q2. Diode D1 has its cathode connected to the collector of IGBT element Q1 and its anode connected to the emitter of IGBT element Q1. Diode D2 has its cathode connected to the collector of IGBT element Q2 and its anode connected to the emitter of IGBT element Q2.

Boost converter 12B of FIG. 1 is similar to boost converter 12A in the internal circuit configuration, provided that it is connected to power supply line PL1B, instead of power supply line PL1A. Therefore, detailed description thereof will not be repeated. Further, for the sake of simplification, FIG. 3 is depicted with control signals PWU and PWD applied to the boost converter. As shown in FIG. 1, different control signals PWUA and PWDA and control signals PWUB and PWDB are applied to boost converters 12A and 12B, respectively.

Figure 4:
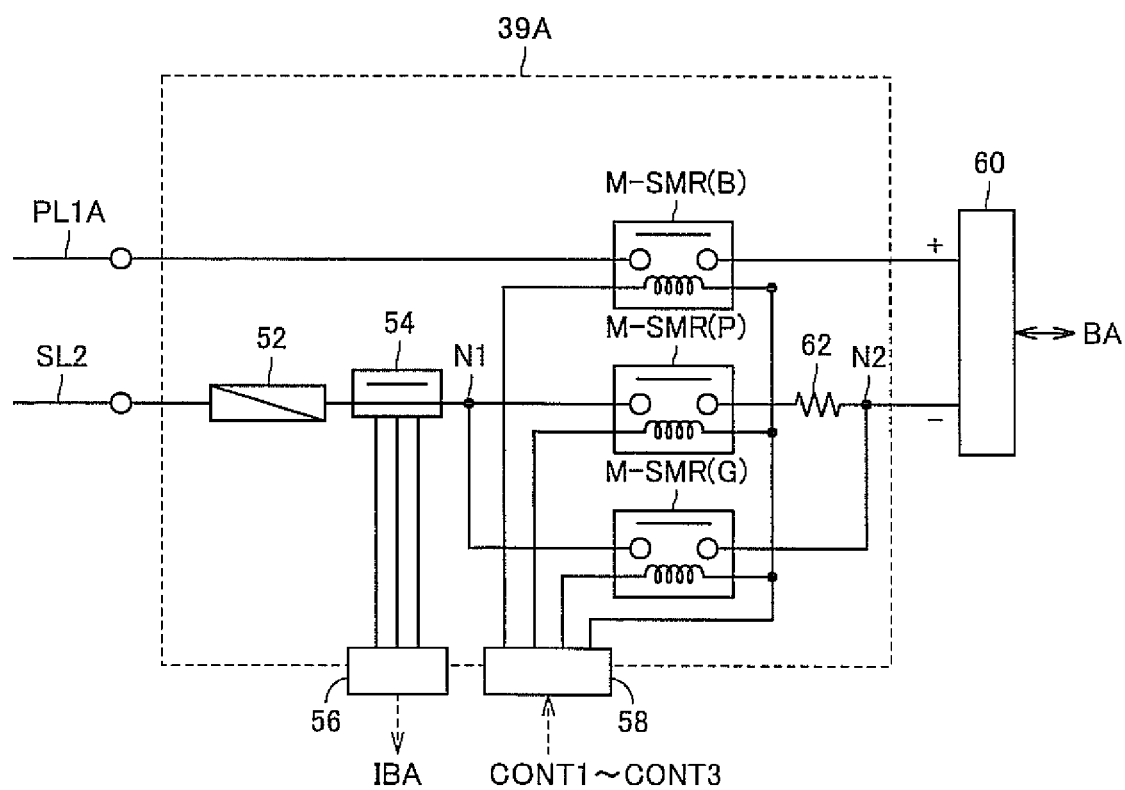
FIG. 4 is a circuit diagram representing a configuration of a master battery connection unit 39A of FIG. 1.

FIG. 4 is a circuit diagram representing a configuration of master battery connection unit 39A of FIG. 1.

Referring to FIG. 4, master battery connection unit 39A includes a system main relay M-SMR (B) arranged between power supply line PL1A and the positive electrode of battery BA to control conduction and disconnection of the current, a system main relay M-SMR (G) connected between ground line SL2 and the negative electrode of battery BA to control ON/OFF of the current, and a current limiting resistor 62 and a system main relay M-SMR (P) connected in series between nodes N1 and N2 at respective ends of system main relay M-SMR (G).

A fuse 52 and a current sensor 54 are provided between ground line SL2 and node N1. A current detection signal IBA from current sensor 54 is provided to control device 30 of FIG. 1 via connector 56.

Further, signals CONT1-CONT3 for conduction control of system main relays M-SMR (B), M-SMR (P) and M-SMR (G) are provided from control device 30 via connector 58. A connector 60 for connection with battery BA is provided at master battery connection unit 39A.

System main relays M-SMR (B), M-SMR (P) and M-SMR (G) have the conducting/non-conducting state controlled according to control signals CONT1-CONT3, respectively, provided from control device 30.

Before describing slave battery connection unit 39B of FIG. 1, the configuration of a connection unit 139B that is a review example will be described first. In this review example, a configuration similar to that of master battery connection unit 39A is provided with respect to each battery.

Figure 5:
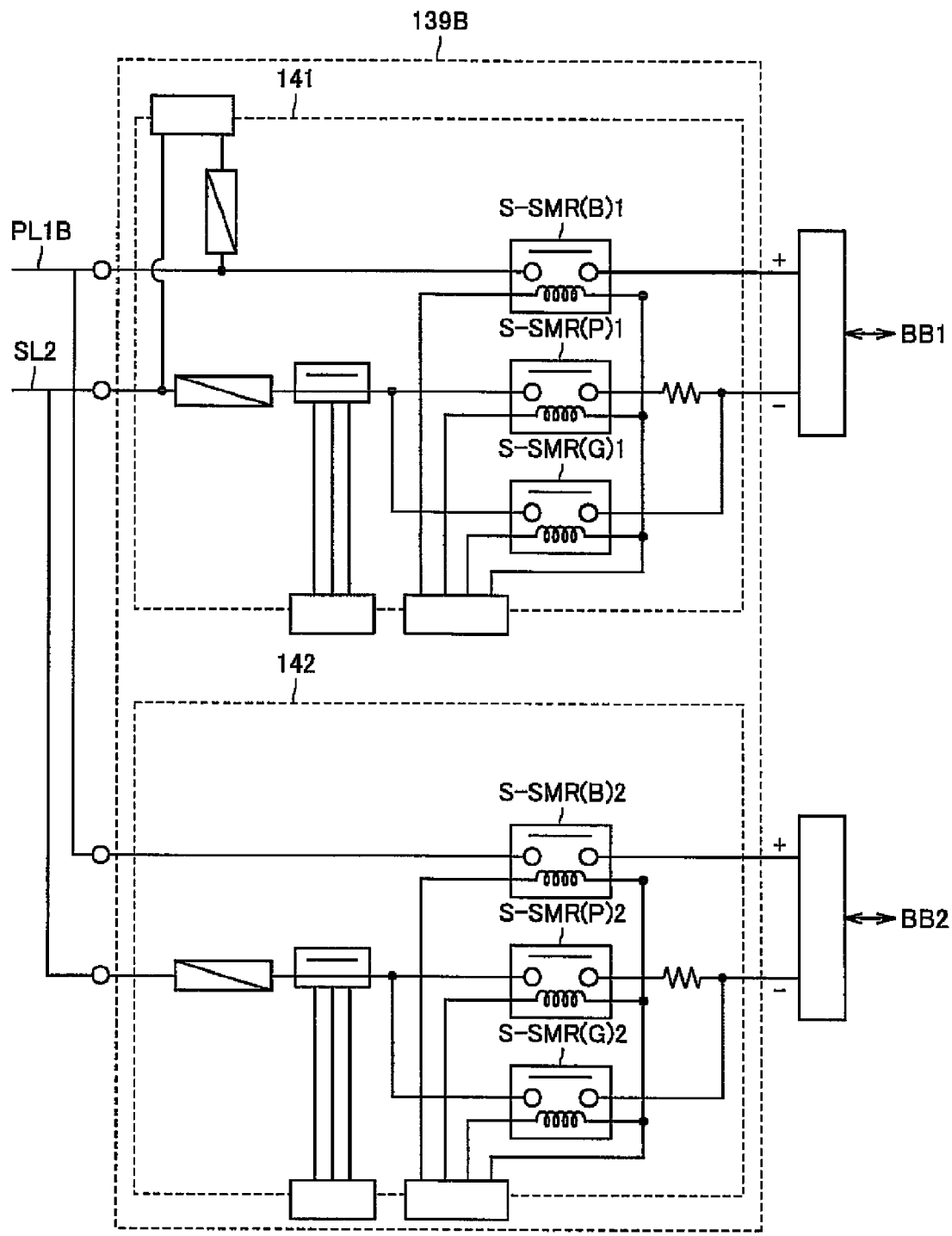
FIG. 5 is a circuit diagram representing a configuration of a connection unit 139B as an example for review.

Referring to FIG. 5, connection unit 139B includes a connection unit 141 provided corresponding to battery BB1, and a connection unit 142 provided corresponding to battery BB2. Connection unit 141 includes a system main relay S-SMR (B) 1 for ON/OFF control of the positive electrode, and system main relays S-SMR (P) 1 and S-SMR (G) 1 for ON/OFF control of the negative electrode.

Connection unit 142 includes a system main relay S-SMR (B) 2 for ON/OFF control of the positive electrode, and system main relays S-SMR (P) 2 and S-SMR (G) 2 for ON/OFF control of the negative electrode.

Connection units 141 and 142 are both connected to power supply line PL1B and ground line SL2.

Figure 6:
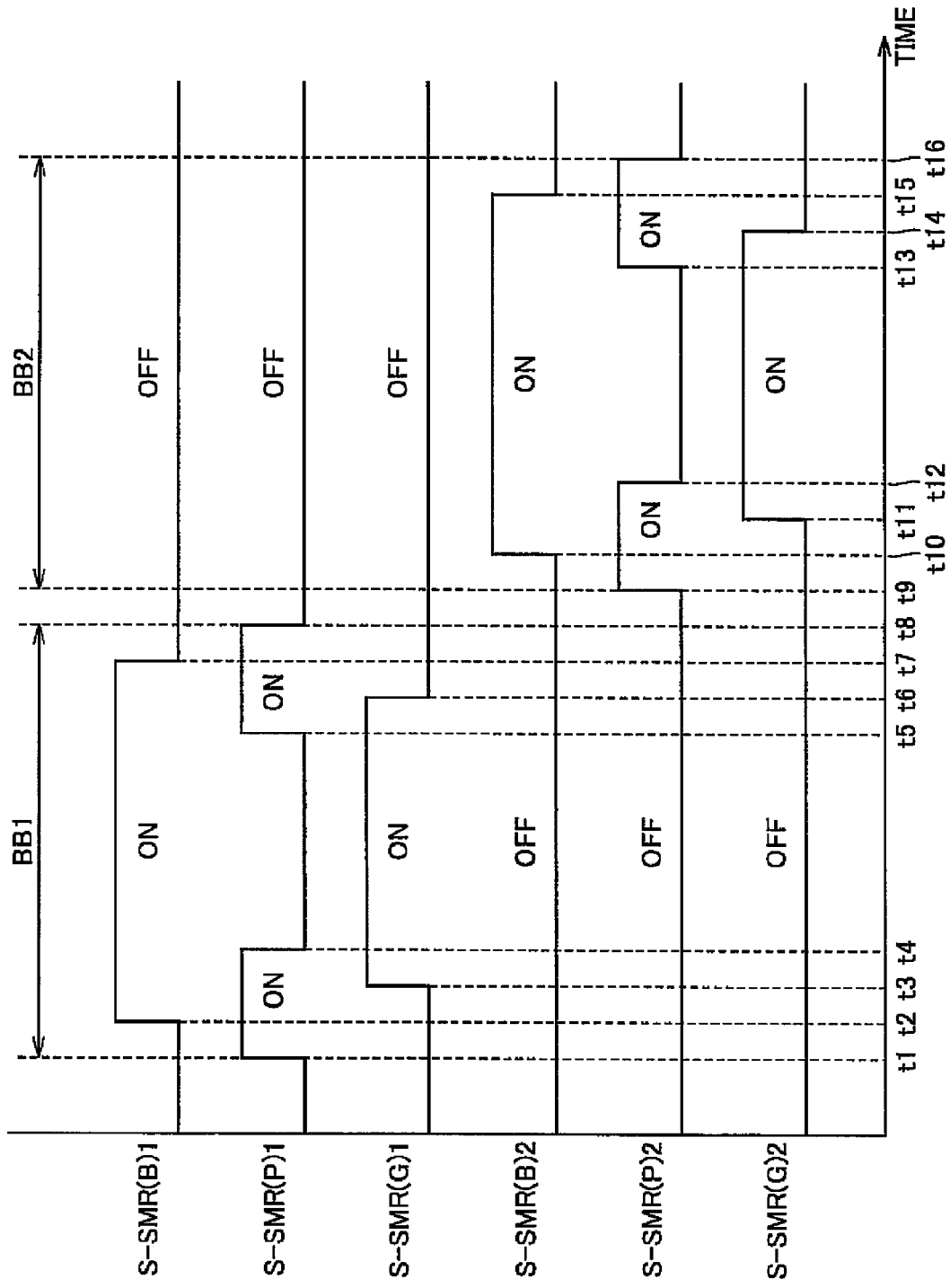
FIG. 6 is an operational waveform diagram representing a sequence of switching the battery for usage from a battery BB1 to a battery BB2 by means of connection unit 139B of FIG. 5.

FIG. 6 is an operational waveform diagram representing the sequence of switching the battery for usage from battery BB1 to battery BB2 by means of connection unit 139B shown in FIG. 5.

Referring to FIGS. 5 and 6, time t1-t8 corresponds to the period of usage of battery BB1, whereas time t9-t16 corresponds to the period of usage of battery BB2.

At time t1, system main relay S-SMR (P) 1 is turned to an ON state from an OFF state. At time t2, system main relay S-SMR (B) 1 is turned to an ON state from an OFF state. When precharging of capacitor C2 ends, system main relay S-SMR (G) 1 is turned from an OFF state to an ON state at time t3. At time t4, system main relay S-SMR (P) 1 is set to an OFF state. At time t4-t5, battery BB1 is discharged, and inverters 14 and 22 and/or motor generators MG1 and MG2 that are loads are operated.

When the state of charge of battery BB1 becomes low, the operation to disconnect battery BB1 is initiated.

At time t5, system main relay S-SMR (P) 1 is turned to an ON state from an OFF state. At time t6, system main relay S-SMR (G) 1 is turned to an OFF state from an ON state. At time t7, system main relay S-SMR (B) 1 is turned to an OFF state from an ON state. At time t8, system main relay S-SMR (P) 1 is turned to an OFF state from an ON state. Accordingly, the disconnection procedure of battery BB1 ends.

Subsequently, a connecting operation and disconnecting operation similar to those of battery BB1 are carried out for battery BB2.

At time t9, system main relay S-SMR (P) 2 is turned to an ON state from an OFF state. At time t10, system main relay S-SMR (B) 2 is turned to an ON state from an OFF state. When precharging of capacitor C2 ends, system main relay S-SMR (G) 2 is turned to an ON state from an OFF state at time t11. At time t12, system main relay S-SMR (P) 2 is set at an OFF state. At time t12-t13, battery BB2 is discharged, and inverters 14 and 22 and motor generators MG1 and MG2 that are loads are operated.

When the vehicle arrives at a destination and the driver sets a vehicle immobilize operation, the operation of disconnecting battery BB2 is initiated.

At time t13, system main relay S-SMR (P) 2 is turned to an ON state from an OFF state. At time t14, system main relay S-SMR (G) 2 is turned to an OFF state from an ON state. At time t15, system main relay S-SMR (B) 2 is turned to an OFF state from an ON state. At time t16, system main relay S-SMR (P) 2 is turned to an OFF state from an ON state. Thus, the disconnecting operation of battery BB2 ends.

The switching operation of batteries BB1 and BB2 is allowed even with the configuration of the review example of FIG. 5 set forth above. However it is to be noted that six system main relays are provided at connection unit 139B, including duplicate current sensors and fuses, as shown in FIG. 5. A more simple configuration is desirable.

Figure 7:
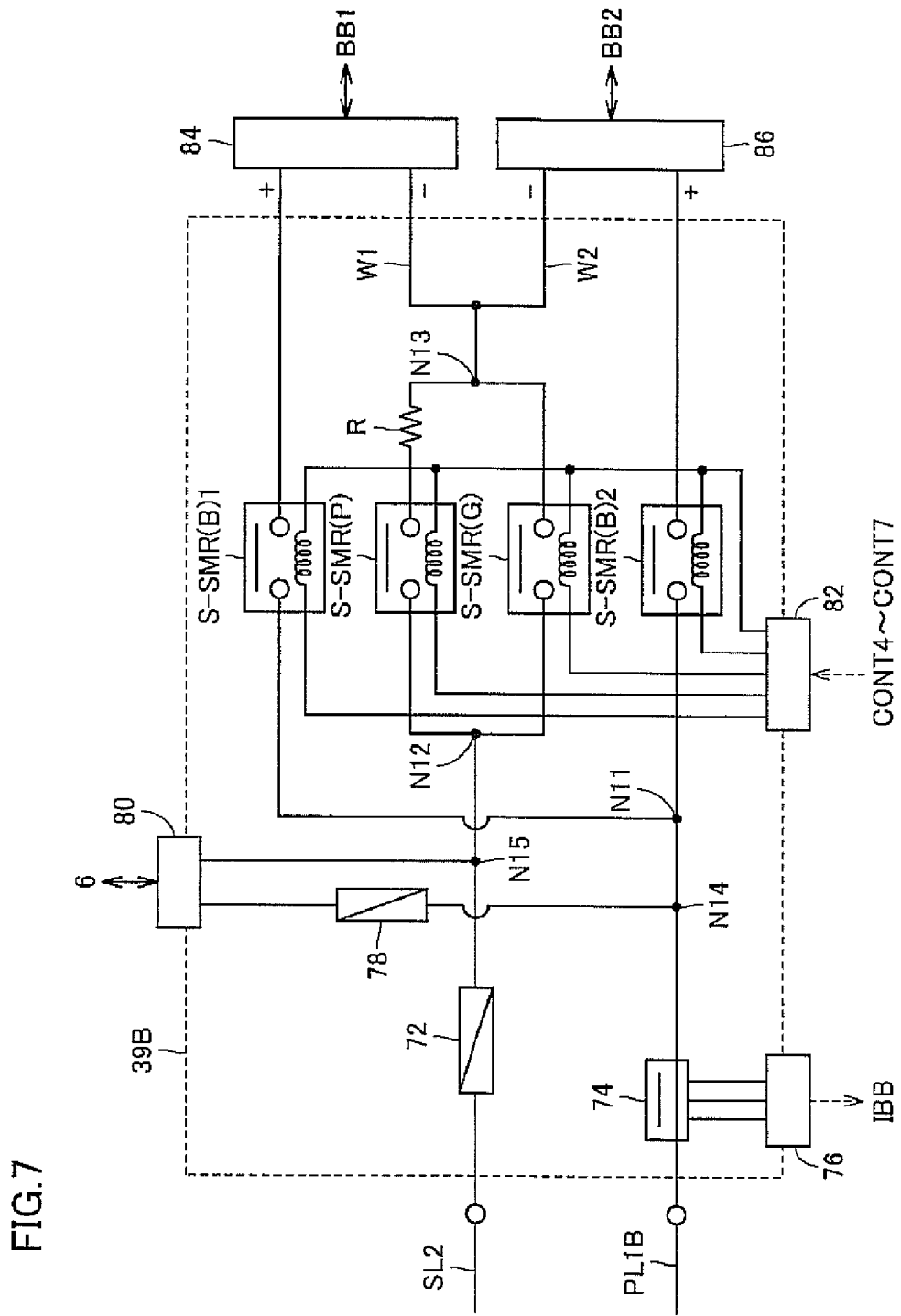
FIG. 7 is a circuit diagram representing a configuration of a slave battery connection unit 39B of FIG. 1 employed in an embodiment.

FIG. 7 is a circuit diagram representing a configuration of slave battery connection unit 39B of FIG. 1 employed in the present embodiment.

Referring to FIG. 7, slave battery connection unit 39B includes a system main relay S-SMR (B) 1 for ON/OFF control of the current flowing across the positive electrode of battery BB1 and power supply line PL1B, a system main relay S-SMR (G) connected between the negative electrode of battery BB1 and ground line SL2, and a current limiting resistor R and a system main relay S-SMR (P) connected parallel to system main relay S-SMR (G), between nodes N12 and N13.

Slave battery connection unit 39B further includes a system main relay S-SMR (B) 2 for ON/OFF control of the current flowing across the positive electrode of battery BB2 and power supply line PL1B. System main relay S-SMR (B) 1 and system main relay S-SMR (B) 2 both have the vehicle load side connected to node N11. Node N11 is connected to node N14. A current sensor 74 is provided at the current path between node N14 and power supply line PL1B. Node N14 is also connected to a connector 80 for connection with battery charge converter 6. A fuse 78 is provided during the connection path to connector 80.

System main relay S-SMR (P) and system main relay S-SMR (G) both have the vehicle load side connected to node N12. Node N12 is connected to a node N15. A fuse 72 is provided between node N15 and ground line SL2. Node N15 is connected to connector 80 for connection with battery charge converter 6.

System main relay S-SMR (P) has its battery side connected to a node N13 via current limiting resistor R. System main relay S-SMR (G) has its battery side connected to node N13. The negative electrode of battery BB1 is connected with node N13 by a wiring W1. The negative electrode of battery BB2 is connected with node N13 by a wiring W2.

Slave battery connection unit 39B further includes a connector 76 to take out output signal IBB of current sensor 74, a connector 82 to input conduction control signals CONT4-CONT7 of the system main relays, a connector 84 for connecting battery BB1, a connector 86 for connecting battery BB2, and a connector 80 for connecting battery charge converter 6.

System main relays S-SMR (B) 1, S-SMR (B) 2, S-SMR (P) and S-SMR (G) have the conducting/non-conducting state controlled according to control signals CONT4-CONT7 applied from control device 30.

Figure 8:
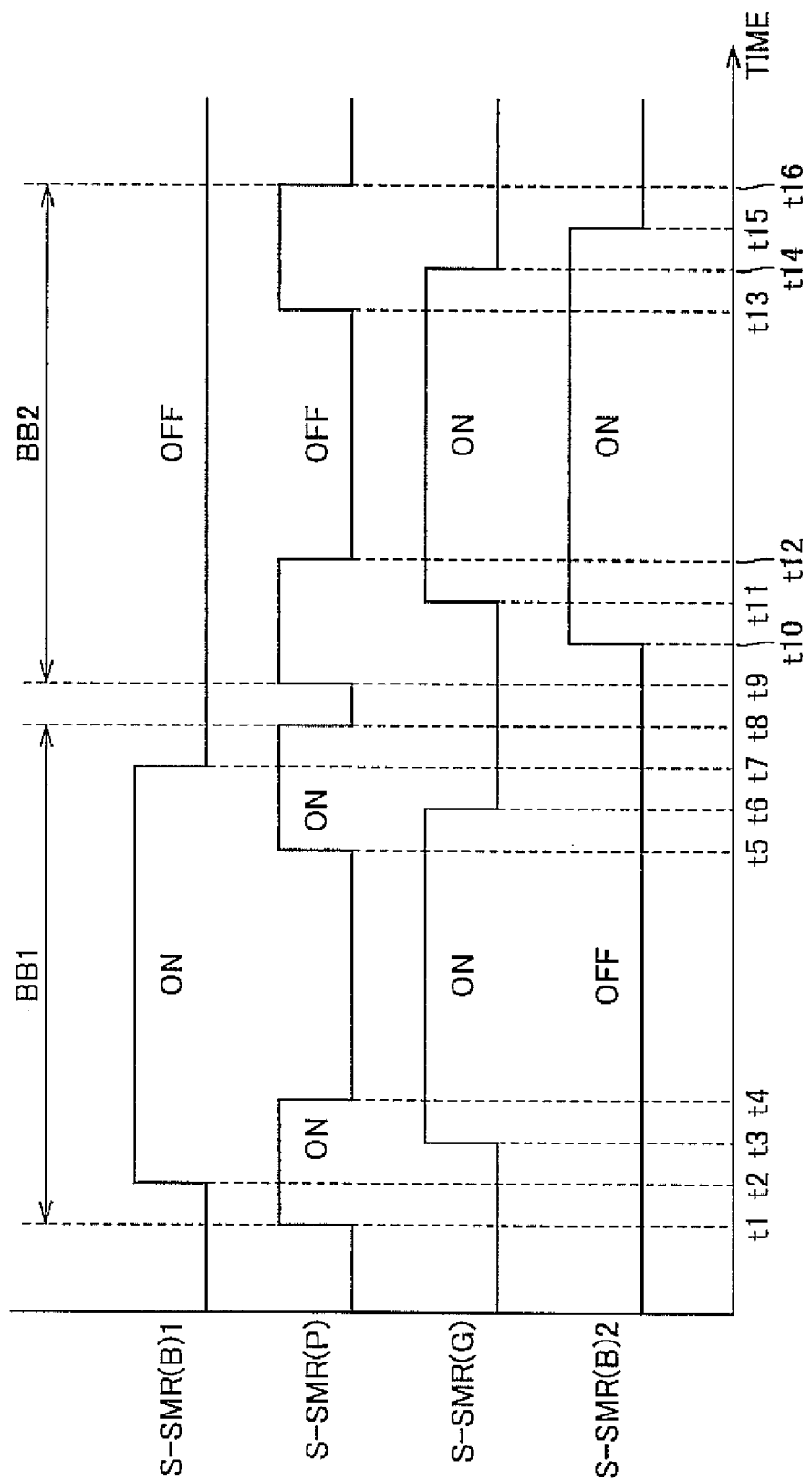
FIG. 8 is an operational waveform diagram of switching connection from battery BB1 to battery BB2 by means of slave battery connection unit 39B.

FIG. 8 is an operational waveform diagram of switching the connection from battery BB1 to battery BB2 by means of slave battery connection unit 39B.

Referring to FIGS. 7 and 8, time t1-t8 corresponds to the period of usage of battery BB1, and time t9-t16 correspond to the period of usage of battery BB2.

At time t1, system main relay S-SMR (P) is turned to an ON state from an OFF state. At time t2, system main relay S-SMR (B) 1 is turned to an ON state from an OFF state. When precharging of capacitor C2 ends, system main relay S-SMR (G) is turned from an OFF state to an ON state at time t3. At time t4, system main relay S-SMR (P) is set to an OFF state. At time t4-t5, battery BB1 is discharged, and inverters 14 and 22 and/or motor generators MG1 and MG2 that are loads are operated.

When the state of charge of battery BB1 becomes low, the operation to disconnect battery BB1 is initiated.

At time t5, system main relay S-SMR (P) is turned to an ON state from an OFF state. At time t6, system main relay S-SMR (G) is turned to an OFF state from an ON state. At time t7, system main relay S-SMR (B) 1 is turned to an OFF state from an ON state. At time t8, system main relay S-SMR (P) is turned to an OFF state from an ON state. Accordingly, the disconnection operation of battery BB1 ends.

Subsequently, a connecting operation and disconnecting operation similar to those of battery BB1 are carried out for battery BB2.

At time t9, system main relay S-SMR (P) is turned to an ON state from an OFF state. At time t10, system main relay S-SMR (B) 2 is turned to an ON state from an OFF state.

When precharging of capacitor C2 ends, system main relay S-SMR (G) is turned to an ON state from an OFF state at time t11. At time t12, system main relay S-SMR (P) is set at an OFF state. At time t12-t13, battery BB2 is discharged, and inverters 14 and 22 and/or motor generators MG1 and MG2 that are loads are operated.

When the vehicle arrives at a destination and the driver sets a vehicle immobilize operation, the operation of disconnecting battery BB2 is initiated.

At time t13, system main relay S-SMR (P) is turned to an ON state from an OFF state. At time t14, system main relay S-SMR (G) is turned to an OFF state from an ON state. At time t15, system main relay S-SMR (B) 2 is turned to an OFF state from an ON state. At time t16, system main relay S-SMR (P) is turned to an OFF state from an ON state. Thus, the disconnecting operation of battery BB2 ends.

In a vehicle incorporating at least two or more hybrid vehicle batteries as set forth above, the number of system main relays can be reduced to 4 from 6. The number of components and the weight can be reduced, which in turn can lower the cost.

The present embodiment will be summarized hereinafter with reference to FIGS. 1, 7 and the like. Connection unit 39B connecting batteries BB1 and BB2 to the vehicle load includes a first relay (S-SMR (B) 1) connected between a first electrode of battery BB1 and a first power feed line towards the vehicle load, a second relay (S-SMR (G)) connected between a second electrode of battery BB1 having a polarity differing from the polarity of the first electrode and a second power feed line towards the vehicle load, a third relay (S-SMR (P)) and a current limiting resistor R connected in series between the second electrode of battery BB1 and a second power supply line, a fourth relay (S-SMR (B) 2) connected between the electrode of battery BB2 having a polarity identical to the polarity of the first electrode and the first power feed line towards the vehicle load, and a conductor line (W1, W2) connecting the electrode of battery BB2 having a polarity identical to the polarity of the second electrode with the second electrode of battery BB1.

Preferably, the first relay (S-SMR (B) 1) and the fourth relay (S-SMR (B) 2) have the vehicle load side connected at first internal node N11. Connection unit 39B further includes current sensor 74 arranged between first internal node N11 and power supply line PL1B towards the vehicle load. Fuse 72 may be arranged between internal node N14 and power supply line PL1B towards the vehicle load.

Preferably, the third relay (S-SMR (P)) and current limiting resistor R are connected in series between second internal node N12 and third internal node N13. The second relay (S-SMR (G)) is connected between second internal node N12 and third internal node N13. Connection unit 39B further includes fuse 72 arranged between one of second and third internal nodes N12 and N13 located at the vehicle load side and ground line SL2 towards the vehicle load. Current sensor 74 may be arranged between internal node N15 and ground line SL2 towards the vehicle load.

The present embodiment was described based on FIG. 7 corresponding to the case of a configuration in which a relay S-SMR G at the negative electrode side of a plurality of batteries is shared. Alternatively, a configuration may be employed in which relay S-SMR B at the positive electrode side of a plurality of batteries is shared, and a relay S-SMR G of the negative electrode side is provided for each of the plurality of batteries. In this case, relay S-SMR P connected to limiting resistor R should be shifted to the negative side to be shared. Furthermore, the current sensor and fuse are preferably moved to the negative electrode side.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A connection unit for connecting first and second power storage devices to a vehicle load, provided separately from a connection unit for connecting a main power storage device to said vehicle load, said first and second power storage devices differing from said main power storage device, comprising:
   a first relay connected between a first electrode of said first power storage device and a first power feed line towards said vehicle load,
   a second relay connected between a second electrode of said first power storage device having a polarity different from the polarity of said first electrode and a second power feed line towards said vehicle load,
   a third relay and a current limiting resistor connected in series between said second electrode of said first power storage device and said second power feed line,
   a fourth relay connected between an electrode of said second power storage device having a polarity identical to the polarity of said first electrode and said first power feed line towards said vehicle load, and
   a conductor line connecting an electrode of said second power storage device having a polarity identical to the polarity of said second electrode to said second electrode.

2. The connection unit according to claim 1, wherein a side of said first relay corresponding to said vehicle load and a side of said fourth relay corresponding to said vehicle load are connected at a first internal node,
   said connection unit further comprising one of a current sensor and a fuse arranged between said first internal node and said vehicle load.

3. The connection unit according to claim 1, wherein
   said third relay and said current limiting resistor are connected in series between a second internal node and a third internal node,
   said second relay is connected between said second internal node and said third internal node,
   said connection unit further comprising one of a current sensor and a fuse arranged between said vehicle load and one of said second and third internal nodes located at said vehicle load side.

4. A vehicle comprising a connection unit for connecting first and second power storage devices to a vehicle load, said connection unit being provided separately from a connection unit for connecting a main power storage device to said vehicle load, said first and second power storage devices differing from said main power storage device, said connection unit including
   a first relay connected between a first electrode of said first power storage device and a first power feed line towards said vehicle load,
   a second relay connected between a second electrode of said first power storage device having a polarity different from the polarity of said first electrode and a second power feed line towards said vehicle load,
   a third relay and a current limiting resistor connected in series between said second electrode of said first power storage device and said second power feed line,
   a fourth relay connected between an electrode of said second power storage device having a polarity identical to the polarity of said first electrode and said first power feed line towards said vehicle load, and a conductor line connecting an electrode of said second power storage device having a polarity identical to the polarity of said second electrode to said second electrode.

5. The vehicle according to claim 4, wherein
a side of said first relay corresponding to said vehicle load and a side of said fourth relay corresponding to said vehicle load are connected at a first internal node,
said connection unit further includes one of a current sensor and a fuse arranged between said first internal node and said vehicle load.

6. The vehicle according to claim 4, wherein
said third relay and said current limiting resistor are connected in series between a second internal node and a third internal node,
said second relay is connected between said second internal node and said third internal node,
said connection unit further includes one of a current sensor and a fuse arranged between said vehicle load and one of said second and third internal nodes located at said vehicle load side.

7. The connection unit according to claim 1, wherein
said connection unit for connecting a main power storage device to said vehicle load is connected between said main power storage device and a first boost converter boosting a voltage of said main power storage device and supplying a boosted voltage to said vehicle load, and
said first and second power feed lines are connected to a second boost converter for boosting a voltage of said first or second power storage device and supplying a boosted voltage to said vehicle load.

8. The vehicle according to claim 4, wherein
said connection unit for connecting a main power storage device to said vehicle load is connected between said main power storage device and a first boost converter boosting a voltage of said main power storage device and supplying a boosted voltage to said vehicle load, and
said first and second power feed lines are connected to a second boost converter for boosting a voltage of said first or second power storage device and supplying a boosted voltage to said vehicle load.

* * * * *